United States Patent
Tamura

(10) Patent No.: US 11,677,885 B2
(45) Date of Patent: Jun. 13, 2023

(54) IMAGE FORMING APPARATUS INCLUDING A CONTACT MEMBER FOR OPERATING AN ELECTROSTATIC TOUCH PANEL

(71) Applicant: KYOCERA Document Solutions Inc., Osaka (JP)

(72) Inventor: Yoshiaki Tamura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/666,859

(22) Filed: Feb. 8, 2022

(65) Prior Publication Data
US 2022/0256050 A1   Aug. 11, 2022

(30) Foreign Application Priority Data
Feb. 10, 2021 (JP) .............................. JP2021-019644

(51) Int. Cl.
*H04N 1/00* (2006.01)
*G06F 3/0354* (2013.01)

(52) U.S. Cl.
CPC ..... *H04N 1/00904* (2013.01); *G06F 3/03545* (2013.01); *H04N 1/00392* (2013.01); *H04N 1/00907* (2013.01)

(58) Field of Classification Search
CPC ........... H04N 1/00904; H04N 1/00392; H04N 1/00907; G06F 3/03545
See application file for complete search history.

(56) References Cited

U.S. PATENT DOCUMENTS

| | | | | |
|---|---|---|---|---|
| 2012/0165883 | A1* | 6/2012 | Kalgren | A61B 5/0006 607/18 |
| 2014/0266026 | A1* | 9/2014 | Dowd | H02J 7/0044 320/108 |
| 2014/0320445 | A1* | 10/2014 | Kim | G06F 3/046 345/174 |
| 2016/0344880 | A1* | 11/2016 | Lea | H04N 1/00411 |
| 2017/0131848 | A1* | 5/2017 | Yeh | G06F 3/0446 |
| 2018/0039343 | A1* | 2/2018 | Park | G06F 3/03545 |
| 2021/0026287 | A1* | 1/2021 | Shimazoe | G03G 15/80 |

FOREIGN PATENT DOCUMENTS

JP  2019-207559  12/2019

\* cited by examiner

*Primary Examiner* — Benjamin O Dulaney
(74) *Attorney, Agent, or Firm* — Lex IP Meister, PLLC

(57) ABSTRACT

An image forming apparatus includes a printing section, an electrostatic touch panel, a power source circuit section, and a contact member. The printing section performs printing. The electrostatic touch panel receives a touch operation by a user. The power source circuit section receives supply of power from a commercial power source and supplies power to the printing section and the electrostatic touch panel. The contact member is connected to a ground of an image forming apparatus and is touched by a user operating the electrostatic touch panel.

4 Claims, 6 Drawing Sheets

IMAGE FORMING APPARATUS INCLUDING A CONTACT MEMBER FOR OPERATING AN ELECTROSTATIC TOUCH PANEL

INCORPORATION BY REFERENCE

This application is based upon and claims the benefit of priority from the corresponding Japanese Patent Application No. 2021-019644 filed on Feb. 10, 2021, the entire contents of which are incorporated herein by reference.

BACKGROUND

The present disclosure relates to an image forming apparatus including an electrostatic touch panel that receives an operation of a user.

There are image forming apparatuses such as multifunction peripherals, printers, and copiers. An image forming apparatus may be provided with a touch panel display for receiving settings. The touch panel display displays a setting image (button and the like) on a screen. An image for the operated settings is recognized based on output from the touch panel. In recent years, there have been image forming apparatuses in which capacitive touch panel displays are mounted.

Patent Document 1 describes an operation device (image forming apparatus) including a capacitive touch panel display. Specifically, the operation device includes a plurality of capacitive operation keys which are displayed to represent operation positions and to which operation contents are allocated, and a capacitive dummy key which is arranged in the vicinity of the operation keys and which is not displayed, determines whether the operation keys and the dummy key are pressed, and when two or more special operation keys preliminarily selected from the plurality of operation keys are pressed, determines that if the dummy key is not pressed, it is an input instruction of a special operation different from the operation contents allocated to the special operation keys and that if the dummy key is pressed, it is not an input instruction of the special operation. This operation device attempts to prevent the mode from shifting to the special mode even if a user keeps touching the panel with his/her palm without any operation intention and a plurality of special operation keys are touched for a predetermined time or more.

The capacitive touch panel display has various advantages. For example, it is advantageous in that the transmittance is high and the screen appears clean. Furthermore, some of the capacitive touch panel displays can detect touches at a plurality of points and others can recognize gesture operation. Due to these advantages, there are an increasing number of image forming apparatuses equipped with a capacitive touch panel display.

Based on the change in capacitance, the capacitive touch panel display recognizes the touch position. The capacitive touch panel display is provided with a transparent electrode. When a finger is brought close to the capacitive touch panel display, capacitive coupling occurs between the finger and the electrode. By monitoring the level of the voltage (current) of the electrode and its change, the change in capacitance and the touch position are recognized.

Since recognition is performed based on the level of a voltage (current) of an electrode or a change thereof, the capacitive touch panel display is prone to be influenced by electrical noise. Under the influence of noise, a problem may occur in the capacitive touch panel display. Specifically, an abnormality in which no touch is detected (no response) may occur. In addition, the touch position may be erroneously detected.

Next, devices in the same building may be noise sources. Specifically, devices such as machine tools, air conditioners, and refrigerators may be noise sources. These devices may affect the capacitive touch panel display via a power distribution wiring (AC power source line) of a building and cause operation failure. For example, a current of an apparatus in the same building fluctuates a reference potential (ground potential) of the building (power distribution wiring). A difference between a fluctuating reference potential of the image forming apparatus and a reference potential of the user may be one of the causes of the abnormality and the erroneous detection of the capacitive touch panel display.

When the image forming apparatus is grounded, the reference potentials of the user and of the image forming apparatus become equal or substantially equal. Then, there is no difference from the reference potential which is a cause of abnormality and erroneous detection. However, large-scale work may be required for grounding the image forming apparatus. Without grounding (if the image forming apparatus is connected to an outlet), the image forming apparatus basically operates without any problem. Many users do not connect the image forming apparatus to the ground. However, since the image forming apparatus is not grounded, an abnormality or an erroneous detection of the capacitive touch panel display tends to occur. Even without being grounded, the capacitive touch panel display should anyway be prevented from generating any abnormality or erroneous detection.

There is no description in Patent Document 1 of a technique for coping with electrical noise generated by devices in the same building. Therefore, the technology described in Patent Document 1 cannot solve the above-described problem.

In consideration of the above-described problem of the conventional art, the present disclosure avoids occurrence of abnormality and erroneous detection of an electrostatic touch panel display even if an image forming apparatus is not grounded.

SUMMARY

An image forming apparatus according to the present disclosure includes a printing section, an electrostatic touch panel, a power source circuit section, and a contact member. The printing section performs printing. The electrostatic touch panel receives a touch operation by a user. The power source circuit section receives supply of power from a commercial power source and supplies power to the printing section and the electrostatic touch panel. The contact member is connected to a ground of an image forming apparatus and is touched by a user operating the electrostatic touch panel.

These and other objects, features and advantages of the present disclosure will become more apparent upon reading of the following detailed description along with the accompanied drawings.

DETAILED DESCRIPTION

An embodiment of the present disclosure will be described below with reference to FIGS. 1 to 6. The following description will be given taking a multifunction peripheral 100 as an example of an image forming apparatus. Provided that elements such as the configuration and the arrangement described in the embodiments do not limit the scope of the disclosure and are merely explanatory examples.

(An Outline of the Multifunction Peripheral 100)

Figure 1:
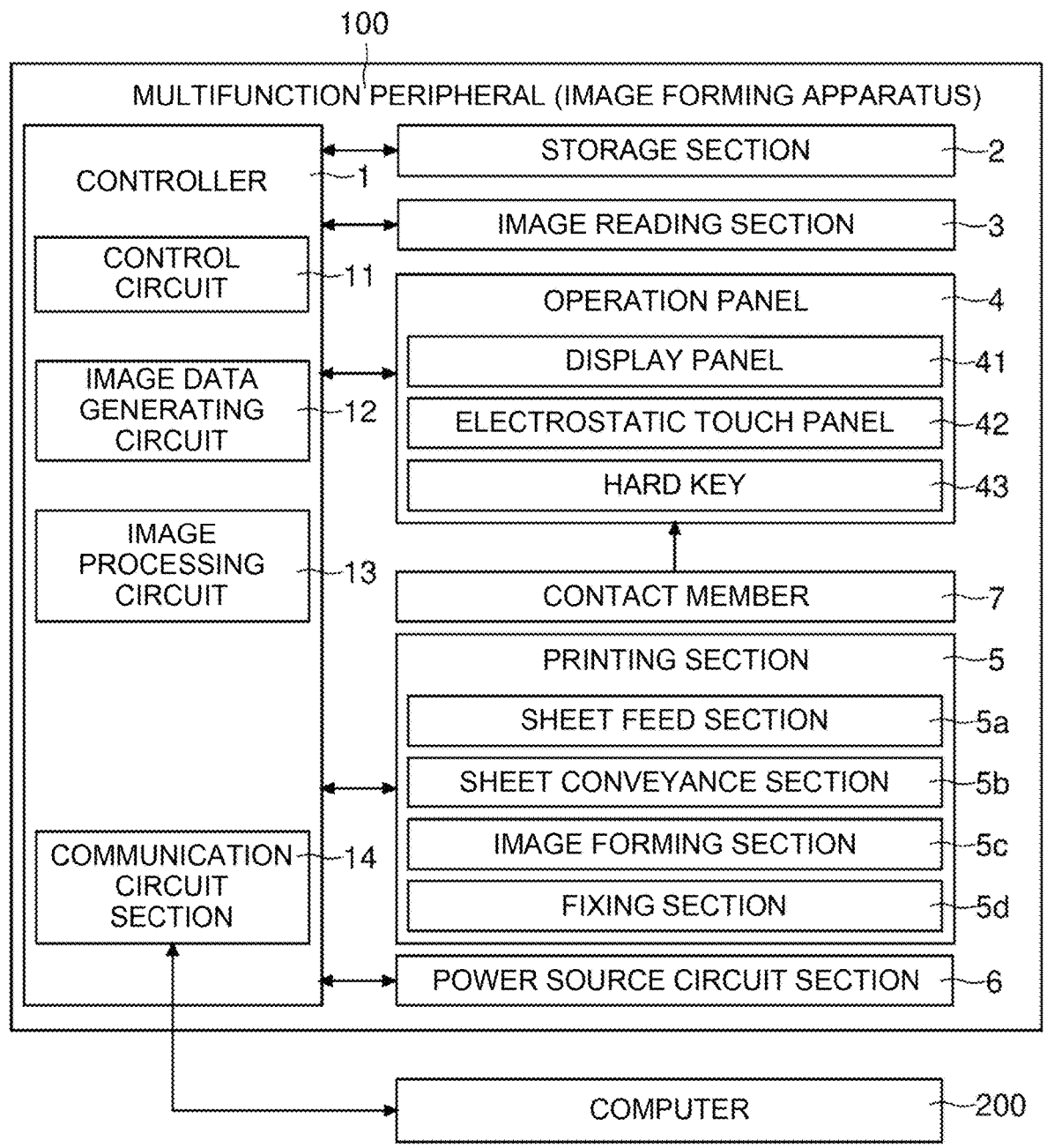
FIG. 1 is a diagram illustrating an example of a multifunction peripheral according to an embodiment.

First, an outline of a multifunction peripheral 100 according to an embodiment will be described with reference to FIG. 1. FIG. 1 is a diagram illustrating an example of a multifunction peripheral 100 according to an embodiment.

The multifunction peripheral 100 includes a controller 1, a storage section 2, an image reading section 3, an operation panel 4, a printing section 5, and a power source circuit section 6. The controller 1 controls operation of the multifunction peripheral 100. The controller 1 controls operation of various components of the multifunction peripheral 100 in a job (copy or transmission). The controller 1 is a board (main control board) which includes a control circuit 11, an image data generating circuit 12, an image processing circuit 13, and a communication circuit section 14. The control circuit 11 performs processing and calculation related to a job. The image data generating circuit 12 includes an A/D conversion circuit. The image data generating circuit 12 processes the analog image signal output from the image reading section 3 by reading a document to generate document image data. The image processing circuit 13 is an integrated circuit for image processing (e.g. ASIC). The image processing circuit 13 performs image processing on the document image data.

The communication circuit section 14 includes a communication control circuit and a communication memory. The communication memory stores communication software. Based on the communication software, the communication control circuit controls communication. The communication circuit section 14 communicates with the computer 200. The computer 200 is, for example, a PC or a server. The communication circuit section 14 receives printing data from the computer 200. Based on the received printing data, the controller 1 causes the printing section 5 to perform printing (a print job). Furthermore, the operation panel 4 receives setting of a destination. The controller 1 causes the communication circuit section 14 to transmit a transmission file to the set destination, based on the document image data (a scan transmission job).

The multifunction peripheral 100 includes an RAM, ROM and a storage as the storage section 2. For example, the storage is one or both of an HDD and an SSD. Based on the programs and data stored in the storage section 2, the controller 1 controls the various sections. The image reading section 3 includes a light source and an image sensor. The image reading section 3 reads a document and outputs an analog image signal.

The operation panel 4 receives a user's setting. The operation panel 4 includes a display panel 41, an electrostatic touch panel 42, and hard keys 43. The electrostatic touch panel 42 is provided on an upper surface (display surface) of the display panel 41. The controller 1 causes the display panel 41 to display a message, a setting screen, and an operation image. The operation image includes, for example, buttons, keys, and tabs. For example, the electrostatic touch panel 42 is a projection-type capacitive touch panel. The electrostatic touch panel 42 can detect multi-touch. Based on the recognized touch position, the controller 1 recognizes the operated operation image. The hard keys 43 include a start key and a numeric keypad. The electrostatic touch panel 42 and the hard keys 43 receive a setting operation (job related operation) from a user. For example, the type of a job to be executed and the setting of a setting value for the job are received. Based on the output of the operation panel 4, the controller 1 recognizes the setting content.

The multifunction peripheral 100 includes a printing section 5. The printing section 5 includes a sheet feed section 5a, a sheet conveyance section 5b, an image forming section 5c, and a fixing section 5d. For example, the sheet feed section 5a includes a sheet feed cassette for setting sheets and a sheet feed roller for feeding sheets. In printing, the controller 1 causes the sheet feed section 5a to feed a sheet. The sheet conveyance section 5b includes, for example, a motor and a conveyance roller pair. The controller 1 causes the sheet fed from the sheet feed section 5a to be conveyed to the sheet conveyance section 5b. The image forming section 5c includes, for example, a photosensitive drum, a charging device, an exposure device, a developing device, and a transfer roller. The controller 1 charges the photosensitive drum and exposes the photosensitive drum based on image data. Next, the controller 1 develops the electrostatic latent image on the photosensitive drum with toner. The controller 1 also transfers the toner image to the sheet. For example, the fixing section 5d includes a heater and a fixing roller. The controller 1 controls the fixing section 5d to apply heat and pressure to the sheet with the toner image transferred thereto. The controller 1 causes the fixing section 5d to fix the toner image.

(Power Source Circuit Section 6)

Figure 2:
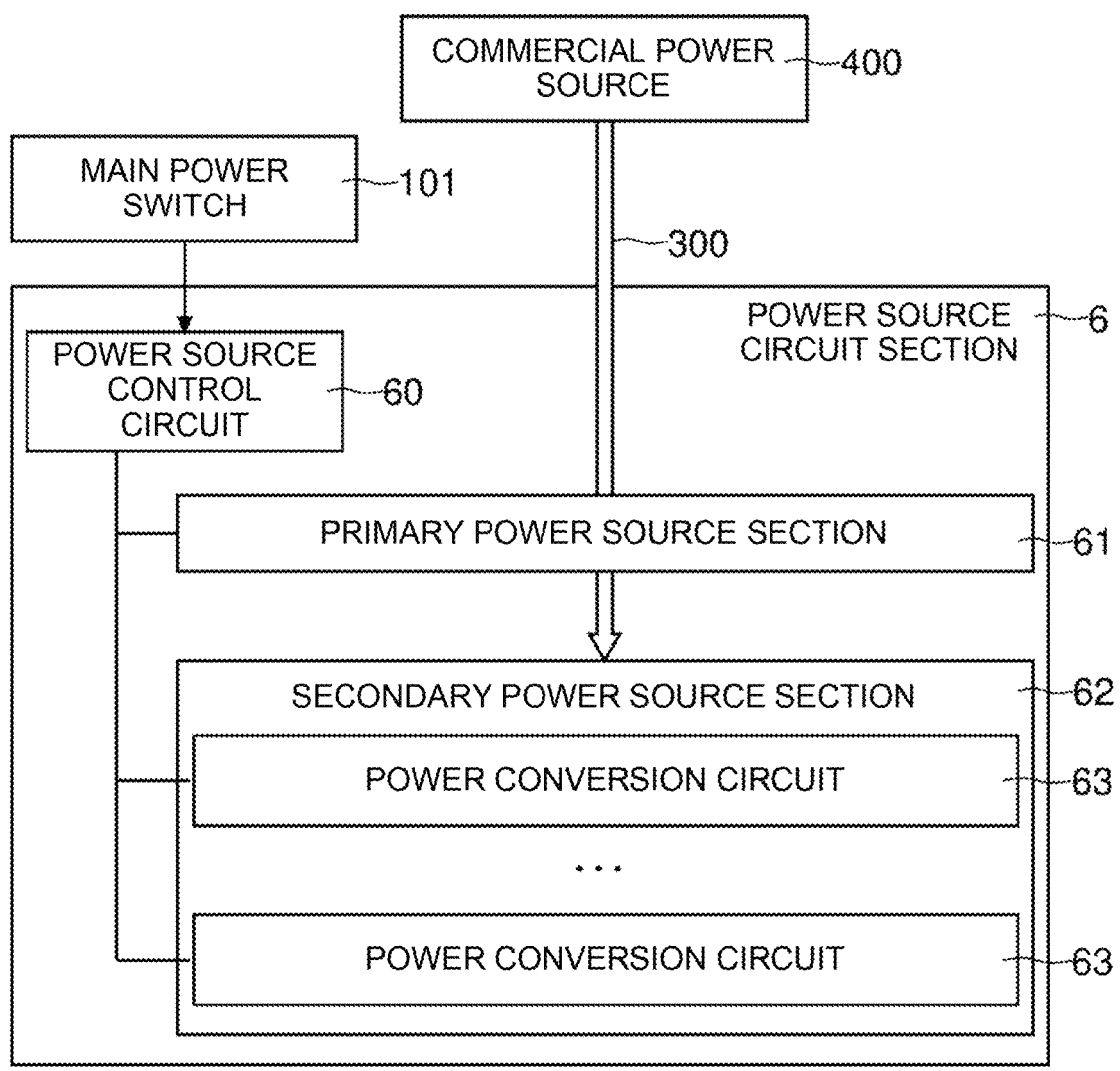
FIG. 2 is a diagram showing an example of a power source circuit section according to the embodiment.

Next, an example of the power source circuit section 6 according to the embodiment will be described with reference to FIG. 2. FIG. 2 is a diagram showing an example of the power source circuit section 6 according to the embodiment.

The multifunction peripheral 100 includes a power source circuit section 6 (power source board). The power source circuit section 6 includes a power source control circuit 60, a primary power source section 61, and a secondary power source section 62.

A power cord 300 (power cable) is connected to the primary power source section 61. Thus, the primary power source section 61 is connected to the commercial power source 400 (AC power source). Specifically, the power from the commercial power source 400 is distributed by indoor wiring of a building. An outlet is provided for each wire for distribution. A plug of the power cord 300 is inserted in this outlet. Thus, the power from the commercial power source 400 is input to the primary power source section 61.

The primary power source section 61 is, for example, a switching power source including a transformer. The primary power source section 61 generates a DC voltage from a commercial power source 400 (AC voltage). When the power cord 300 and the commercial power source 400 (AC power source) are connected, the primary power source section 61 operates. The primary power source section 61 generates and outputs a preset voltage (e.g. DC24V).

A plurality of types of voltages are required for operating the controller 1, the storage section 2, the image reading section 3, the operation panel 4, and the printing section 5. Therefore, the secondary power source section 62 generates a plurality of types of DC voltages in accordance with the voltage generated by the primary power source section 61. For generating a plurality of types of voltages, the secondary power source section 62 includes a plurality of power conversion circuits 63. The power conversion circuit 63 is, for example, a DCDC converter or a regulator. Each of the power conversion circuits 63 outputs a voltage of a preset magnitude. A voltage generated by the secondary power source section 62 is supplied to various components of the multifunction peripheral 100. For example, the voltage generated by the secondary power source section 62 is supplied to the controller 1, the storage section 2, the image reading section 3, the operation panel 4 (including the electrostatic touch panel 42) and the printing section 5.

The power source control circuit 60 controls operation of the primary power source section 61 and the secondary power source section 62. When the main power switch 101 of the multifunction peripheral 100 is in an ON state, the power source control circuit 60 causes the secondary power source section 62 to operate. When the main power switch 101 is in an OFF state, the power source control circuit 60 stops the secondary power source section 62.

(Electrostatic Touch Panel 42)

Figure 3:
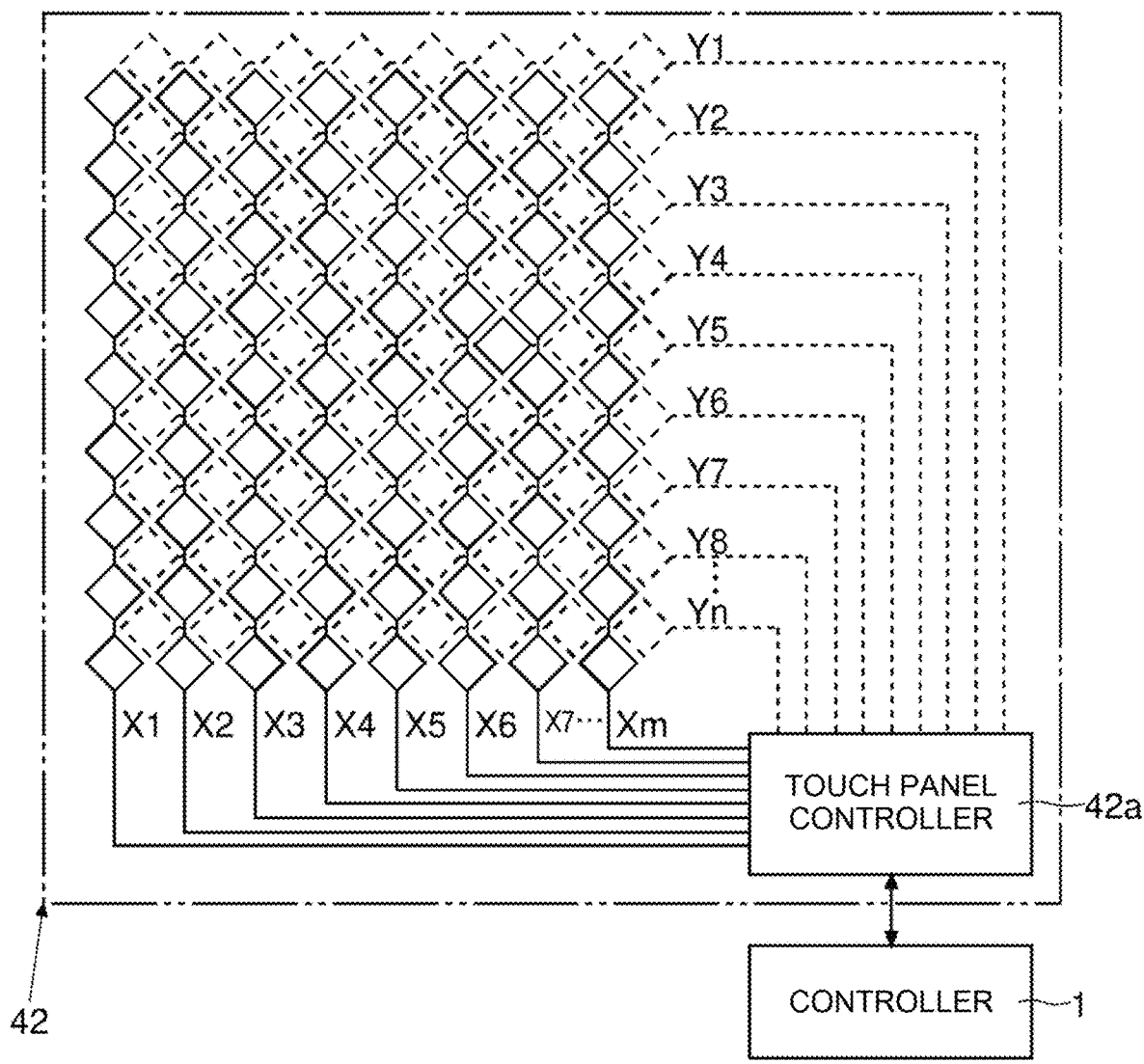
FIG. 3 is a diagram illustrating an example of an electrostatic touch panel according to the embodiment.

Next, an example of the electrostatic touch panel 42 according to the embodiment will be described with reference to FIG. 3. FIG. 3 is a diagram illustrating an example of the electrostatic touch panel 42 according to the embodiment.

The operation panel 4 includes an electrostatic touch panel 42. The electrostatic touch panel 42 is a capacitive touch panel. The electrostatic touch panel 42 is attached to a display surface of the display panel 41. The electrostatic touch panel 42 includes electrodes arranged in a matrix. The electrode is transparent. The electrostatic touch panel 42 includes a plurality of diamond-shaped (square-shaped) electrodes (hereinafter referred to as X electrodes) made by conductive films connected in the X direction (the longitudinal direction of FIG. 3). In FIG. 3, signs X1 to Xn are illustrated. Furthermore, the electrostatic touch panel 42 also includes a plurality of diamond-shaped (square-shaped) electrodes (hereinafter referred to as Y electrodes) made by conductive films connected in the Y direction (the horizontal direction of FIG. 3). In FIG. 3, signs Y1 to Yn are illustrated. The resolution of the electrostatic touch panel 42 is determined based on the number of the X electrodes and the number of the Y electrodes.

The electrodes are connected to the touch panel controller 42*a*. When the user touches, capacitances of the electrode and the user are coupled. Capacitance of an electrode is different between a case where a user is touching or moving a finger close to the electrode and a case where the user is not touching the electrode.

For example, the touch panel controller 42*a* applies a voltage to one electrode from either X or Y electrodes. The touch panel controller 42*a* sequentially switches the electrodes, in either X or Y electrodes, to which a voltage is to be applied. Furthermore, the touch panel controller 42*a* reads the voltage of each of the other electrodes (electrodes to which no voltage is applied) and recognizes the electrodes whose capacitances have changed from the capacitances in a non-touch state. The touch panel controller 42*a* determines and recognizes a touch position (touch coordinates) on the basis of what numbered electrode is an electrode to which a voltage has been applied and what numbered electrode is an electrode whose electrostatic capacity has changed. The touch panel controller 42*a* notifies the controller 1 of the recognized coordinates.

Note that the electrostatic touch panel 42 may recognize the touch position (touch coordinates) by using another method. For example, the touch panel controller 42*a* may measure the charging speed of the charge for each electrode and recognize the touch position (touch coordinates). Furthermore, the electrostatic touch panel 42 may be a capacitive touch panel of another type rather than the projection type.

(Reference Potential of the Multifunction Peripheral 100)

Figure 4:
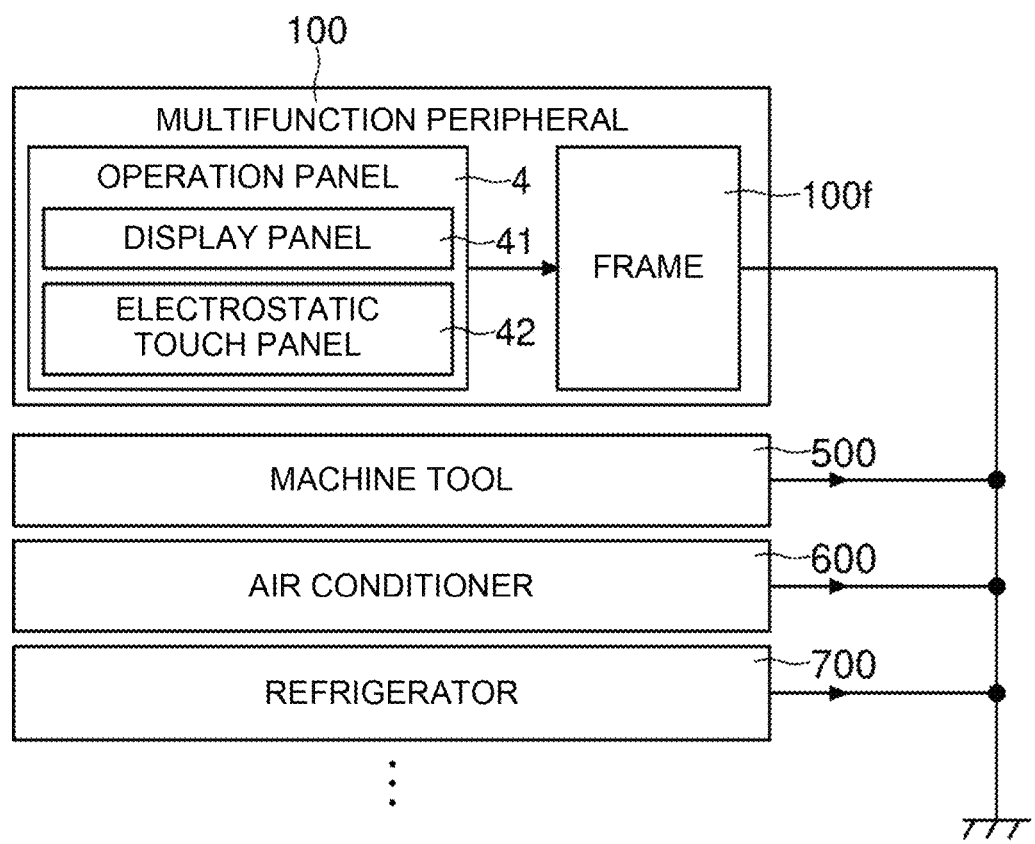
FIG. 4 is a diagram illustrating an example of a reference potential of the multifunction peripheral according to the embodiment.

Next, an example of a reference potential of the multifunction peripheral 100 according to the embodiment will be described with reference to FIG. 4. FIG. 4 is a diagram illustrating an example of a reference potential of the multifunction peripheral 100 according to the embodiment.

In the present description, the reference potential of the multifunction peripheral 100 is a potential serving as a reference for the multifunction peripheral 100, and means a potential of the ground of the multifunction peripheral 100.

First, an electric wire for drawing a commercial power source 400 (an overhead wire, power supplied from a power company) is generally connected to a building. For example, the lead-in electric wire is connected to a distribution board (power board) of a building. Power distribution wires branched from the distribution board are connected to outlets provided in the respective buildings. The power cord 300 of the multifunction peripheral 100 is inserted into this outlet. Thus, AC power from the commercial power source 400 (AC power source) is input (supplied) to the multifunction peripheral 100.

For example, the ground of each board of the multifunction peripheral 100 is connected to the frame 100*f* of the multifunction peripheral 100. The frame 100*f* is electrically conductive. For example, the frame 100*f* is made of iron. The frame 100*f* is a skeleton of the multifunction peripheral 100. The members of the multifunction peripheral 100 are attached to the frame 100*f* or a support member (iron plate) attached to the frame 100*f*. A board (panel board) of the operation panel 4 including the electrostatic touch panel 42 may also be connected to the frame 100*f* of the multifunction peripheral 100. The frame 100*f* of the multifunction peripheral 100 is connected to, for example, the neutral of an outlet. In the multifunction peripheral 100, the conductive frame 100*f* (housing) is at a reference potential for circuit operation (frame ground).

Next, devices such as the machine tool 500, the air conditioner 600, and the refrigerator 700 may be provided in the same building as the building in which the multifunction peripheral 100 is installed. These devices also operate by receiving power from the outlet. Grounds of these devices and a ground of the multifunction peripheral 100 may be connected. FIG. 4 illustrates an example in which the devices and the multifunction peripheral 100 share a common ground.

When the current of each device greatly changes or large noise occurs in one of the devices, the potential of the ground of the multifunction peripheral 100 is influenced via the electric wire for alternating current (for power distribution). That is, the potential of the ground of the multifunction peripheral 100 fluctuates. That is, the ground potentials of the multifunction peripheral 100, the panel board, and the electrostatic touch panel 42 fluctuate.

On the other hand, an operator (user) of the electrostatic touch panel 42 is in contact with the floor or the ground. Therefore, the reference potential of the user is the same or substantially the same as the ground. The reference potential of the user does not fluctuate as in the multifunction peripheral 100.

The touch position on the electrostatic touch panel 42 is detected based on the level change of the small electric signal. The electrostatic touch panel 42 tends to be relatively vulnerable to electrical noise. For example, in a case where a potential of a ground of the multifunction peripheral 100 fluctuates and noise generated by an apparatus reaches the multifunction peripheral 100, an operation failure of the electrostatic touch panel 42 may occur. For example, an abnormality in which a touch is not recognized (unresponsive abnormality) or erroneous detection of a touch position may occur. A difference between a reference potential (ground potential) of the electrostatic touch panel 42 and a reference potential of a user is a cause of the operation abnormality and the erroneous detection.

It is empirically known that abnormality and erroneous detection can be prevented by setting the reference potential (ground potential) of the electrostatic touch panel 42 (multifunction peripheral 100) and the reference potential of the user to be equal to each other. In order to make the reference potential of the multifunction peripheral 100 and the electrostatic touch panel 42 and the reference potential of the user be at the same level, the multifunction peripheral 100 and devices in a building may be grounded. However, in general, electrical work for grounding is laborious and expensive. Depending on the building, grounding work may be on a large scale. In actual, the multifunction peripheral 100 may be used without being grounded. In the present disclosure, the reference potential (ground potential) of the multifunction peripheral 100 and the electrostatic touch panel 42 and the reference potential of the user are made the same level without grounding the multifunction peripheral 100.

(Contact Member 7)

Figure 5:
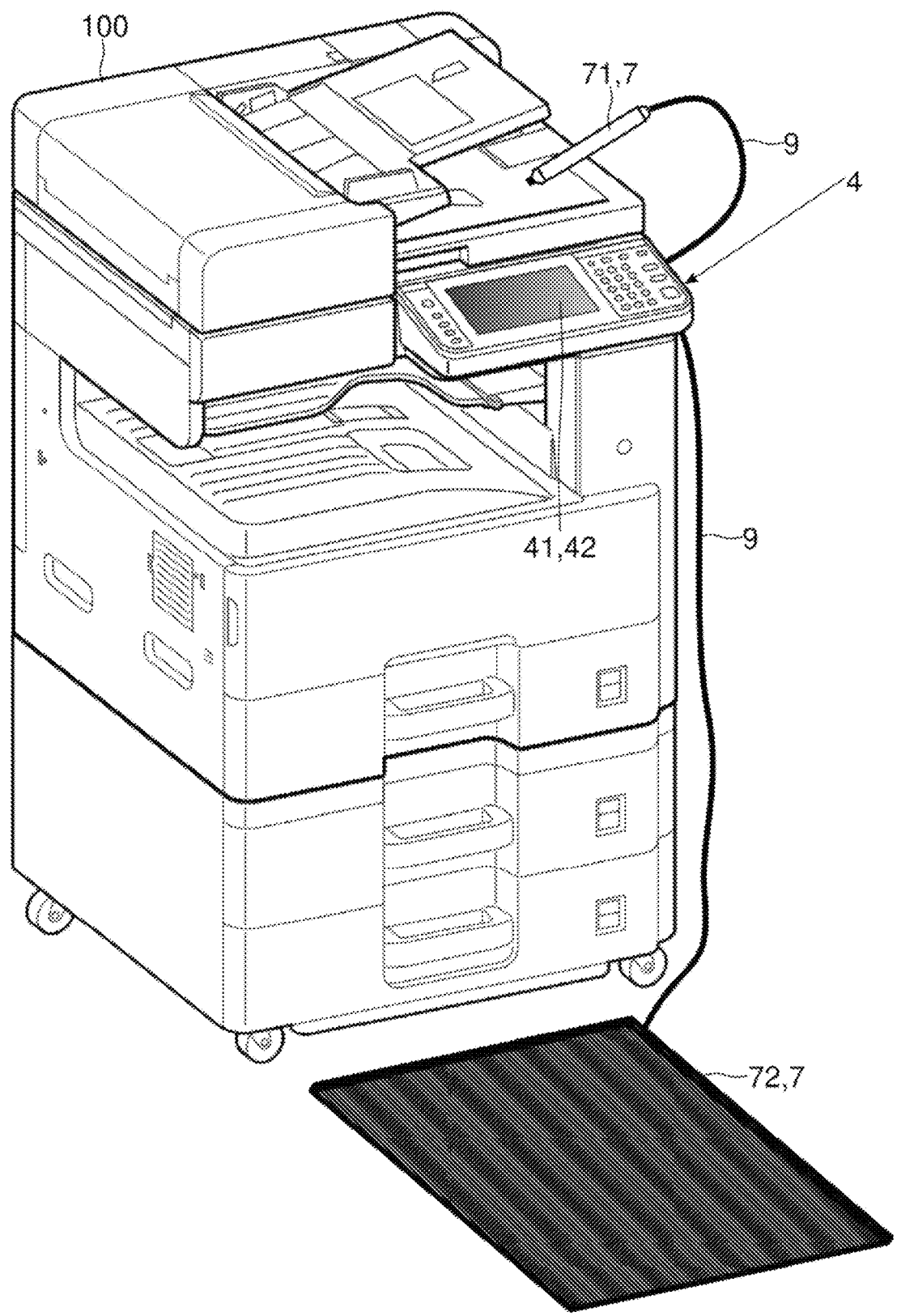
FIG. 5 is a view illustrating an example of the contact member according to the embodiment.
Figure 6:
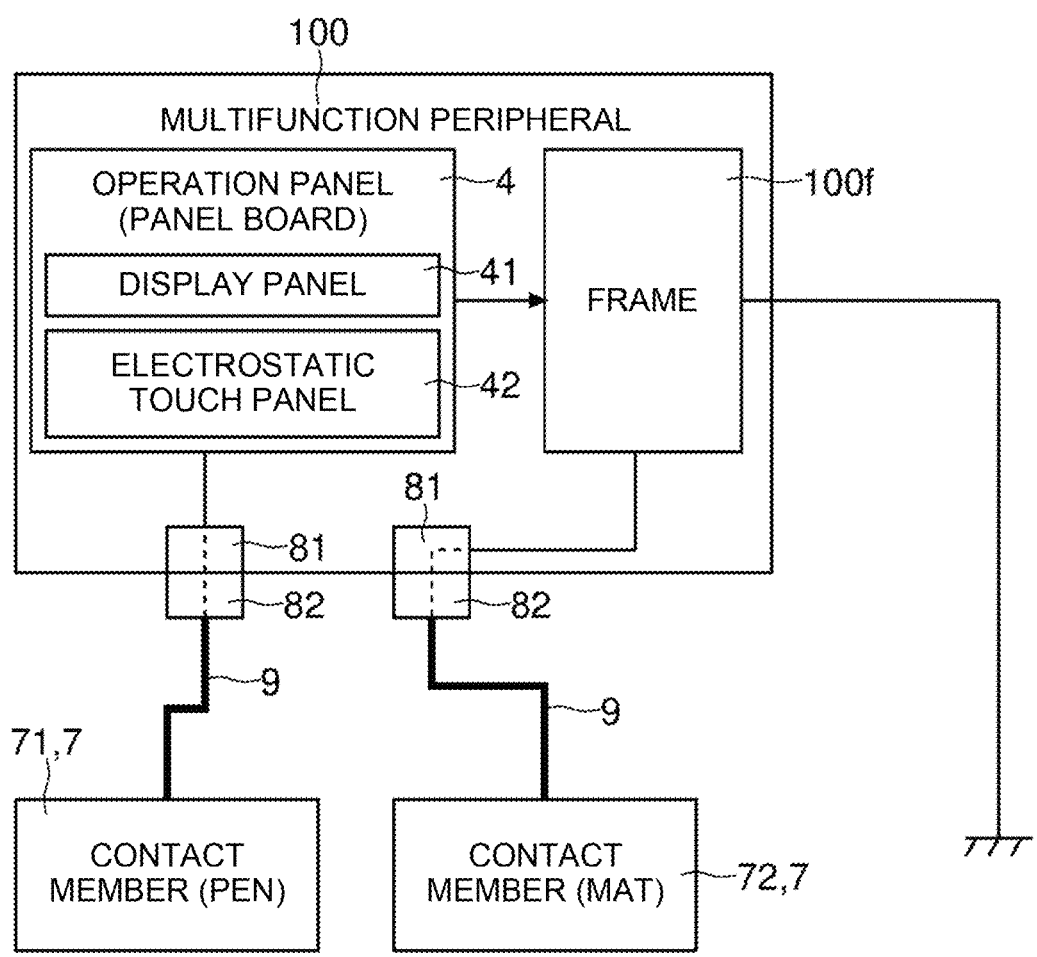
FIG. 6 is a diagram showing an example of connection of contact members according to the embodiment.

Next, an example of the contact member 7 to be attached to the image forming apparatus according to the embodiment will be described with reference to FIGS. 5 and 6. FIG. 5 is a diagram illustrating an example of the contact member 7 according to the embodiment. FIG. 6 is a diagram showing an example of connection of the contact members 7 according to the embodiment.

The contact member 7 can be attached to the multifunction peripheral 100. The contact member 7 is a member for setting a reference potential (ground potential) of the multifunction peripheral 100 or the electrostatic touch panel 42 and a reference potential of a user to the same level. The contact member 7 is a member to be touched by a user operating the electrostatic touch panel 42.

As illustrated in FIG. 5, the contact member 7 attached to the multifunction peripheral 100 is, for example, a pen 71. As illustrated in FIG. 5, the contact member 7 attached to the multifunction peripheral 100 may be a mat 72. One or both of the pen 71 and the mat 72 can be attached to the multifunction peripheral 100 as the contact member 7.

As illustrated in FIG. 6, the multifunction peripheral 100 includes a first connector 81 for connecting the contact member 7. The number of the first connectors 81 may be one or more. Next, the first connector 81 is connected to the ground of the multifunction peripheral 100. As illustrated in FIG. 6, the first connector 81 may be connected to the ground of a board (panel board) including the electrostatic touch panel 42. Furthermore, the first connector 81 may be connected to a frame 100*f* of the multifunction peripheral 100. As such, the contact member 7 is connected to the ground of the multifunction peripheral 100 via the first connector 81.

The conductive cable 9 electrically connects the contact member 7 and the first connector 81. That is, the contact member 7 is connected to the ground of the multifunction peripheral 100 via the conductive cable 9 and the first connector 81. Specifically, the contact member 7 is attached to one end of the conductive cable 9. The second connector 82 is attached to the other end of the conductive cable 9. By connecting the first connector 81 and the second connector 82, the contact member 7 and the first connector 81 (the ground of the electrostatic touch panel 42) are electrically connected.

A portion of the pen 71 that a user touches is made of a conductive material. The conductive material used for the pen 71 may be, for example, a metal material such as copper and aluminum. Furthermore, the conductive material used for the pen 71 may be conductive resin or conductive rubber. The entire pen 71 including the pen tip and the body may be formed of a conductive material. The conductive cable 9 is attached to the conductive material of the pen 71. One end (an end part on the contact member side) of the conductive cable 9 and a conductive material of the pen 71 are electrically connected. The potential of the surface of the pen 71 is at the same level as a reference potential (ground potential) of the multifunction peripheral 100.

As such, the pen 71 is connected to the ground of the multifunction peripheral 100 (electrostatic touch panel 42). Therefore, when a user touches the pen 71 connected to the multifunction peripheral 100, the reference potential of the user becomes the same level as the reference potential (ground potential) of the multifunction peripheral 100.

The pen 71 can be used as an input device for operating the electrostatic touch panel 42. That is, the pen 71 of the contact member 7 can be used as a touch pen (stylus pen). The user touches an operation image (e.g. a button) displayed by the display panel 41 and transmitted through the electrostatic touch panel 42, with the pen tip. A user can perform setting and operation of the multifunction peripheral 100 by touching the electrostatic touch panel 42 with a pen tip.

The mat 72 is placed, for example, on the front surface of the multifunction peripheral 100. The mat 72 is placed at a position where a user of the electrostatic touch panel 42 and the multifunction peripheral 100 stands. A portion touched by a user (a portion on which the user is on) is formed of a conductive material. That is, the upper surface of the mat 72 is made of a conductive material. The conductive material used for the mat 72 may be conductive resin or conductive rubber. Furthermore, a conductive material may be incorporated in the mat 72. A conductive cable 9 is attached to the conductive material of the mat 72. One end (an end part on the contact member side) of the conductive cable 9 and the conductive material of the mat 72 are electrically connected. The mat 72 is connected to the ground of the multifunction peripheral 100 (electrostatic touch panel 42). Therefore, when a user gets on the mat 72 connected to the multifunction peripheral 100, the reference potential of the user becomes the same level as the reference potential (ground potential) of the multifunction peripheral 100.

Thus, the contact member 7 can enable the reference potential of the user and the reference potential (ground potential) of the multifunction peripheral 100 to be set at the same level. As a result, abnormality and erroneous detection of the electrostatic touch panel 42 due to noise (fluctuation of the ground level) caused by devices in the same building do not occur.

A member and a mechanism for connecting the contact member 7 and the ground of the multifunction peripheral 100 may be designed exclusively for the multifunction peripheral 100. Furthermore, in order to connect the contact member 7 and the ground of the electrostatic touch panel 42 (the multifunction peripheral 100) at low cost, the first connector 81 of the multifunction peripheral 100 and the second connector 82 attached to the conductive cable 9 may be those complying with the standards. For example, connectors (the first connector 81 and the second connector 82) compliant with standards, such as the USB standard, which are often used and whose components are available at low cost can be used.

As described above, one end of the conductive cable 9 is connected to the contact member 7. When the first connector 81 of the multifunction peripheral 100 is a male connector, a standards-compliant female connector is attached to the other end of the conductive cable 9 as the second connector 82. When the first connector 81 of the multifunction peripheral 100 is a female connector, a standard-compliant male connector is attached to the other end of the conductive cable 9 as the second connector 82.

For example, in a case where the other end of the conductive cable 9 connected to the pen 71 is a USB standard male connector, the multifunction peripheral 100 is provided with a USB standard female connector. Conversely, when the other end of the conductive cable 9 connected to the pen 71 is a USB standard female connector, the multifunction peripheral 100 is provided with a USB standard male connector.

Furthermore, when the other end of the conductive cable 9 connected to the mat 72 is a USB standard male connector, the multifunction peripheral 100 is provided with a USB standard female connector. Conversely, when the other end of the conductive cable 9 connected to the mat 72 is a USB standard female connector, the multifunction peripheral 100 is provided with a USB standard male connector.

As described above, the image forming apparatus (multifunction peripheral 100) according to the embodiment includes the printing section 5, the electrostatic touch panel 42, the power source circuit section 6, and the contact member 7. The printing section 5 performs printing. The electrostatic touch panel 42 receives a touch operation by a user. The power source circuit section 6 receives supply of power from a commercial power source 400. The power source circuit section 6 supplies power to the printing section 5 and the electrostatic touch panel 42. The contact member 7 is connected to the ground of the image forming apparatus. The contact member 7 is touched by a user operating the electrostatic touch panel 42.

A user's touch of the contact member 7 can thus adjust the level of a reference potential (ground potential) of the image forming apparatus and the level of a reference potential of the user. The potential difference between the reference potentials can be reduced so as to prevent the abnormality and the erroneous detection of the electrostatic touch panel 42 from occurring. Even if the image forming apparatus is not grounded, it is possible to prevent the occurrence of an abnormality (non-response) of the electrostatic touch panel 42 or an erroneous detection of a touch position.

The image forming apparatus includes a connector (first connector 81) connected to the ground. The contact member 7 is connected to the connector via the conductive cable 9.

The contact member 7 can be connected to the ground of the image forming apparatus using the connector and the conductive cable 9. Furthermore, the position of the contact member 7 is not fixed by the conductive cable 9. Furthermore, the contact member 7 can be attached and detached.

The contact member 7 may be a pen 71. A portion of the pen 71 that a user touches is made of a conductive material. The conductive cable 9 and the conductive material of the pen 71 are connected. The contact member 7 may have the shape of a pen 71. A user needs only to touch the pen 71. Simply by touching the pen 71, a user and the image forming apparatus can be made to have the same reference potential.

The pen 71 is also an input device for making an input by contacting with the electrostatic touch panel 42. The contact member 7 can also be used as an input device for operating the electrostatic touch panel 42.

The contact member 7 may be a mat 72. A portion of the mat 72 that a user contacts is made of a conductive material. The conductive cable 9 and the conductive material of the mat 72 are connected. The contact member 7 may be a mat 72. A user needs only to get on the mat 72. Simply by a user getting on the mat 72, the reference potential of the user and that of the image forming apparatus can be made to match.

The connector (the first connector 81) is a male connector or a female connector. When the connector (the first connector 81) is a male connector, a female connector (the second connector 82) is attached to the other end of the conductive cable 9. When the connector (the first connector 81) is a female connector, a male connector (the second connector 82) is attached to the other end of the conductive cable 9. A connector can be used to connect the contact member 7 and the ground of the image forming apparatus. The male connector and the female connector may comply with a standard. The contact member 7 and the ground of the image forming apparatus can be connected by using a connector which is manufactured in accordance with standards and which is distributed in this case. For example, the standard is the USB standard. The configuration for connecting the contact member 7 and the ground of the image forming apparatus can be achieved inexpensively.

Although the embodiment of the present disclosure has been described, the scope of the present disclosure is not limited thereto, and various changes and modifications can be made without departing from the spirit and scope of the disclosure.

The present disclosure is usable in an image forming apparatus including an electrostatic touch panel.

What is claimed is:

1. An image forming apparatus, comprising:
   a printing device;
   an electrostatic touch panel that receives touch operation by a user,
   a power source circuit section which receives power supply from a commercial power source and supplies power to the printing device and the electrostatic touch panel;
   a contact member that is connected to a ground of the image forming apparatus and touched by a user operating the electrostatic touch panel; and
   a connector that is connected to the ground,
   wherein the contact member is connected to the connector via a conductive cable, and
   wherein the contact member is a mat, a portion of the mat that is touched by the user is formed of a conductive material, and one end of the conductive cable is connected to the conductive material of the mat.

2. The image forming apparatus according to claim 1, wherein
the contact member is a pen,
a portion of the pen that is touched by the user is formed of a conductive material, and
the conductive cable is connected to the conductive material of the pen.

3. The image forming apparatus according to claim 2, wherein
the pen is an input device for making an input by contacting with the electrostatic touch panel.

4. The image forming apparatus according to claim 1, wherein
the connector is a male connector or a female connector,
the female connector is attached to other end of the conductive cable when the connector is the male connector, and
the male connector is attached to the other end of the conductive cable when the connector is the female connector.

* * * * *